(12) United States Patent
Koehler et al.

(10) Patent No.: US 9,864,047 B2
(45) Date of Patent: Jan. 9, 2018

(54) SCANNING OPTOELECTRONIC DETECTION DEVICE HAVING A DETECTION THRESHOLD, MOTOR VEHICLE AND CORRESPONDING METHOD

(71) Applicant: VALEO Schalter und Sensoren GmbH, Bietigheim-Bissingen (DE)

(72) Inventors: Michael Koehler, Hamburg (DE); Patrick Berger, Buchholz (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 31 days.

(21) Appl. No.: 14/441,035

(22) PCT Filed: Sep. 18, 2013

(86) PCT No.: PCT/EP2013/069371
§ 371 (c)(1),
(2) Date: May 6, 2015

(87) PCT Pub. No.: WO2014/072105
PCT Pub. Date: May 15, 2014

(65) Prior Publication Data
US 2015/0268331 A1    Sep. 24, 2015

(30) Foreign Application Priority Data
Nov. 8, 2012   (DE) .................. 10 2012 021 831

(51) Int. Cl.
*G01C 3/08* (2006.01)
*G01S 7/48* (2006.01)
(Continued)

(52) U.S. Cl.
CPC .......... *G01S 7/4808* (2013.01); *G01S 7/4817* (2013.01); *G01S 7/497* (2013.01); *G01S 17/026* (2013.01); *G01S 17/08* (2013.01); *G01S 17/936* (2013.01)

(58) Field of Classification Search
CPC ...... G01S 7/4808; G01S 7/4817; G01S 7/497; G01S 17/026; G01S 17/08; G01S 17/936
See application file for complete search history.

(56) References Cited

U.S. PATENT DOCUMENTS

| 4,411,521 A | 10/1983 | Jourdan et al. |
| 5,225,882 A * | 7/1993 | Hosokawa .............. G01S 17/42 356/5.06 |
| 6,819,407 B2 | 11/2004 | Arita et al. |

FOREIGN PATENT DOCUMENTS

| DE | 102010047984 A1 | 4/2012 |
| EP | 0345383 A1 | 12/1989 |

(Continued)

OTHER PUBLICATIONS

International Search Report issued in PCT/EP2013/069371, dated Nov. 28, 2013 (6 pages).

(Continued)

*Primary Examiner* — Samantha K Abraham
(74) *Attorney, Agent, or Firm* — Osha Liang LLP (57) ABSTRACT

The invention relates to a scanning optoelectronic detection device (7), in particular laser scanner, for a motor vehicle, comprising an optical emitter for emitting electromagnetic beams, comprising an optical receiver (10) for receiving beams (9) reflected at a target object in surroundings of the motor vehicle and for providing an electrical reception signal (19) depending on the received beams (9), and comprising an evaluation device (25) for detecting the target object depending on the electrical reception signal (19), wherein the emitter is designed to emit a respective emission (Continued)

beam for a multiplicity of different scanning angles within an entire scanning angle range, and wherein the evaluation device (25) is designed, for each scanning angle, to compare the reception signal (19) with a detection threshold and to detect the target object depending on the comparison, wherein the detection threshold is an angle-dependent threshold value function which has mutually different threshold values for the reception signal (19) for at least two different scanning angles of the emitter.

8 Claims, 5 Drawing Sheets

(51) Int. Cl.
*G01S 17/02* (2006.01)
*G01S 17/93* (2006.01)
*G01S 7/481* (2006.01)
*G01S 7/497* (2006.01)
*G01S 17/08* (2006.01)

(56) References Cited

FOREIGN PATENT DOCUMENTS

| EP | 0773453 A1 | 5/1997 | |
|---|---|---|---|
| EP | 1162478 A1 | 12/2001 | |
| EP | 2287630 A1 * | 2/2011 | ............ G01S 17/10 |
| EP | 2287630 A1 | 2/2011 | |
| WO | 2008071167 A2 | 6/2008 | |

OTHER PUBLICATIONS

Search Report issued in DE 102012021831.1, dated Mar. 25, 2013 (5 pages).

* cited by examiner

SCANNING OPTOELECTRONIC DETECTION DEVICE HAVING A DETECTION THRESHOLD, MOTOR VEHICLE AND CORRESPONDING METHOD

The invention relates to a scanning optoelectronic detection device, in particular laser scanner, for a motor vehicle, comprising an optical emitter for emitting electromagnetic beams into a region of the surroundings of the motor vehicle, comprising an optical receiver for receiving beams reflected in the region of the surroundings and for providing an electrical reception signal depending on the received beams, and comprising an evaluation device for detecting a target object in the region of the surroundings depending on the electrical reception signal. The emitter is designed to emit a respective emission beam for a multiplicity of different scanning angles within an entire scanning angle range, in particular in the azimuth direction or in the horizontal direction. The evaluation device is designed, for each scanning angle, to compare the magnitude of the reception signal with a detection threshold and to detect the target object depending on the comparison. The invention additionally relates to a motor vehicle comprising such a device, and also to a method for operating a detection device of a motor vehicle.

A wide variety of driver assistance systems for detecting objects are increasingly being used in the automotive sector in order to support the driver when driving his/her motor vehicle. In this case, laser-based systems (also known by the designation "Lidar" or "Light Detection and Ranging") enable the identification of objects at a relatively large range of up to more than 100 m from the vehicle with a very high measurement accuracy. They are preferably positioned in the front region of the vehicle, for example behind the windscreen or else on the radiator grille, in order to determine the time to collision (TTC), inter alia. However, such systems can also be positioned in lateral or rear regions of the vehicle, in order to monitor the blind spot or traffic at the rear.

A laser scanner operates according to the light propagation time principle and typically comprises an optical emitter, which emits short laser pulses that are deflected via a pivotable mirror such that a scanning of the entire field of view takes place within a predetermined scanning angle range. In this case, one laser pulse is emitted per scanning angle or per angular step. In the same angular step, without the mirror being moved, the reflected beams are received by means of a receiver, and an electrical reception signal is provided. Said electrical reception signal is analysed. If echoes or pulses are identified in the reception signal, then these can be attributed, in principle, to reflections of the emitted laser pulse at target objects in the surroundings. The time duration between the emission of the laser pulse and the reception of the echo is proportional to the distance to the object. This propagation time is measured and stored as the result of the distance measurement for this angular step.

A laser scanner for motor vehicles is known from the document DE 10 2010 047 984 A1, for example. The scanning optical distance sensor comprises a laser as optical emitter, at least one detector as optical receiver, and a deflection unit, which, with a first mirror, deflects a laser radiation onto the scene to be measured and, with a second mirror, deflects the laser pulses backscattered from objects onto the at least one detector. The first and second mirrors are arranged on a common rotatable spindle driven by a drive unit.

Figure 1:
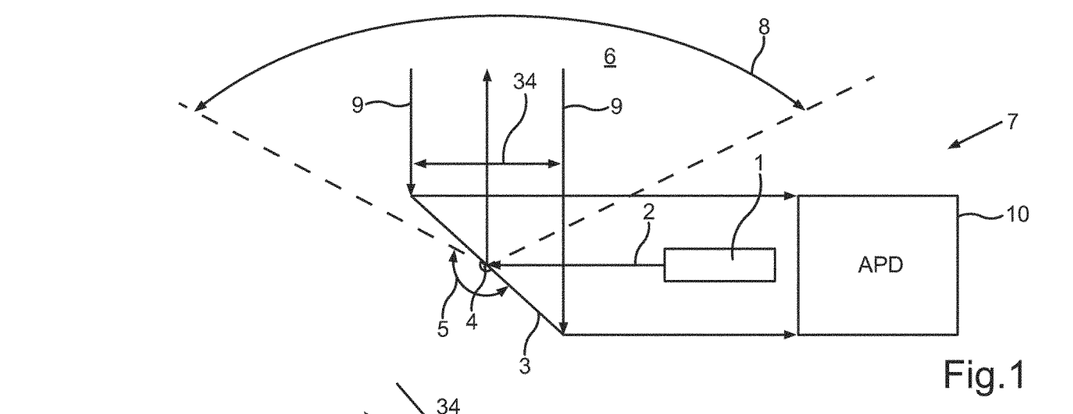
FIG. 1 shows a detection device in accordance with one embodiment in a schematic and abstract illustration.

An exemplary laser scanner is also illustrated in a schematic and abstract illustration in FIG. 1. The laser scanner has an optical emitter comprising a light source 1, in particular a laser source, for emitting beams 2 and a pivotable mirror 3. The mirror 3 can be pivoted about a pivoting axis 4 in accordance with the arrow illustration 5 in order to deflect the beams 2. A field of view 6 of the detection device, which is designated in its entirety by 7, is defined by a scanning angle range 8, in particular in the azimuth direction. Within said scanning angle range 8, the field of view 6 is scanned by the detection device 7, wherein a respective beam pulse is emitted step by step for a multiplicity of different scanning angles within the scanning angle range 8. If the beams 2 are reflected, then the detection device 7 receives reflected beams 9, which are deflected—e.g. by the same mirror 3—onto a photodetector or receiver 10. Embodiments without deflection of the reflected beams 9 or with a separate mirror are likewise possible.

Between two adjacent scanning angles and thus between two temporally adjacent shots there is a time period that depends on the scanning frequency and the angular resolution. Said time period is significantly greater than the propagation time from the emission of the pulse to the return of a reception pulse at the maximum measurement distance, which is usually between 200 and 400 m. At a scanning frequency of 25 Hz, for example, and an angular resolution of 0.25°, there is a total of 27 µs between two shots and thus between the stepping movement of the mirror 3. A distance of 327 m, for example, corresponds to a light propagation time of merely approximately 2.2 µs, such that a time period of approximately 23 µs remains between the conclusion of the measurement on one angular step and the beginning of the next measurement on the next angular step.

Figures 3, 4, 5:
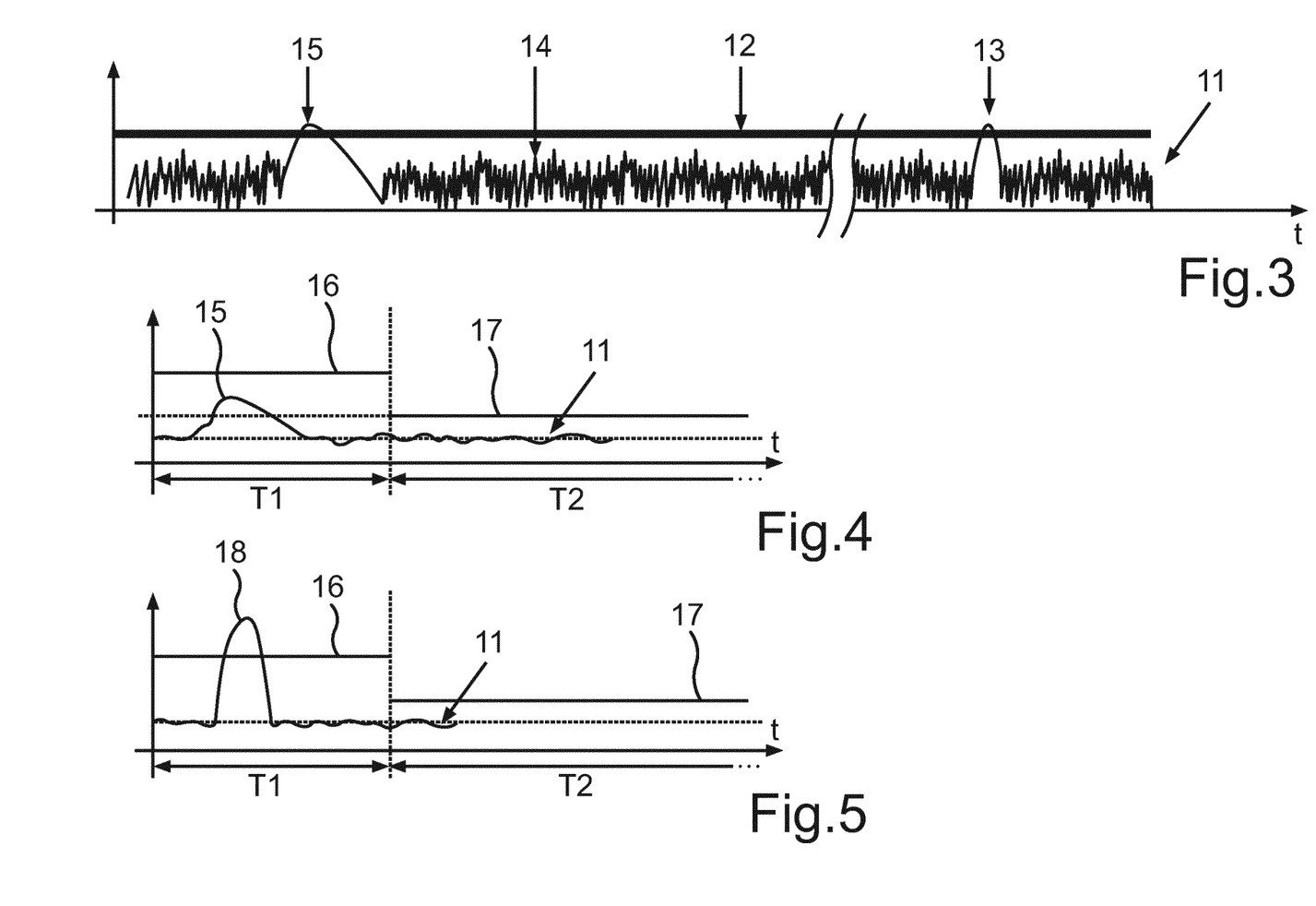
FIG. 3 to FIG. 5 show exemplary temporal profiles of an electrical reception signal with detection thresholds.

Depending on its optical construction, a laser scanner has a dedicated sensitivity profile over distance. In this case, the sensitivity at close range is often higher than at a large distance or at long range by several powers of ten. This can lead to the detection of virtual, fictitious target objects that do not actually exist: in principle, it is endeavoured to detect even poorly reflective targets at a large distance. Therefore, the sensitivity of the laser scanner is intended to be chosen to be high, in principle, in order that even such weakly reflective targets can be detected at a large distance. However, a correspondingly sensitive measurement set-up necessarily also has the consequence that beams with a relatively high energy that are reflected at fictitious targets, such as rain and/or fog and/or spray and/or exhaust gas and/or dirt on a covering screen, are received by the receiver and then interpreted as genuine target objects. Specifically, these reflections have such a high energy that they lie above the detection threshold. If said detection threshold were increased in order to counteract the problem described, this would lead to a reduced sensitivity of the receiver at long range and weakly reflective target objects at a large distance could no longer be detected. This problem is illustrated in FIG. 3 on the basis of a profile of an electrical reception signal 11 at the time t. A detection threshold 12 is set to be correspondingly low in order that genuine target objects from a large distance can also be detected. Such a target echo 13 of the reception signal 11 then lies above the detection threshold 12 and can thus be detected by the evaluation device. In this case, the noise 14 of the reception signal 11 lies below the detection threshold 13. However, such a low detection threshold 13 also necessarily has the consequence that fictitious target echoes 15 at close range are detected which originate from fictitious targets, such as rain/fog/ spray/exhaust gas/dirt. These targets cannot be masked out with such a detection threshold 12.

In the prior art, the identification or masking-out of such atmospheric disturbances while maintaining a relatively high measurement range is based on the use of a plurality of detection thresholds of different magnitudes. At close range, which is particularly sensitive to atmospheric disturbances with regard to measurements, a higher first detection threshold is used. This detection threshold is chosen such that signals of atmospheric disturbances do not exceed this elevated detection threshold at close range. In this case, a second detection threshold is used for the long-range measurement, said second detection threshold corresponding to the detection threshold 12 in accordance with FIG. 3, for example. An exemplary reception signal 11 with a first detection threshold 16 for close range and a second detection threshold 17 for long range is illustrated in FIG. 4. During a first time interval T1 after emission of an emission beam, the first detection threshold 16 is used. The first time interval T1 corresponds to a close range of 15 m from the motor vehicle, for example. The first time interval T1 is then followed directly by a second time interval T2, in which the second detection threshold 17 is used. The two thresholds 16, 17 are in each case set to a constant value, wherein the first threshold 16 is higher than the second threshold 17. As is evident from FIG. 4, a target echo 15 from an atmospheric disturbance is now masked out because the magnitude of said target echo 15 lies below the first threshold 16. Measurements at genuine objects generally have a significantly higher signal energy and exceed even the elevated first detection threshold, as is illustrated on the basis of a genuine target echo 18 in FIG. 5.

It has been found, however, that the use of a constant elevated detection threshold at close range leads to suboptimal results because in various situations the target echo 18 from a genuine target object at close range cannot be detected on account of the elevated detection threshold 16.

It is an object of the invention to demonstrate a solution as to how, in the case of a detection device of the generic type mentioned in the introduction, on the one hand the sensitivity, in particular at close range, can be increased in comparison with the prior art, and on the other hand, it can also be ensured that target echoes originating from atmospheric disturbances can be masked out.

This object is achieved according to the invention by means of a detection device, by means of a motor vehicle and by means of a method comprising the features according to the respective independent patent claims. Advantageous embodiments of the invention are the subject of the dependent patent claims, the description and the figures.

A scanning optoelectronic detection device according to the invention, in particular laser scanner, is designed for detecting a target object in the surroundings of a motor vehicle. The detection device comprises a optical emitter for emitting electromagnetic beams, wherein the emitter is designed to scan a field of view of the detection device, in particular in the azimuth direction or in the horizontal direction, and in this case to emit a respective emission beam, in particular a respective laser pulse, for a multiplicity of different scanning angles within an entire scanning angle range. The detection device also has an optical receiver designed for receiving beams reflected in the surroundings and for providing an electrical reception signal depending on the received beams. An electronic evaluation device detects the target object depending on the electrical reception signal. In this case, the evaluation device is designed, for each scanning angle, to compare the reception signal with a detection threshold and to detect the target object depending on the comparison. The detection threshold is an angle-dependent threshold value function which has mutually different threshold values for the reception signal for at least two different scanning angles of the emitter.

The invention accordingly proposes providing, instead of one detection threshold that is constant for all scanning angles, such a threshold for the reception signal in the case of which, for at least two different scanning angles, in particular for a large number, greater than 2, of different scanning angles, the respective threshold values differ from one another, with which the magnitude of the reception signal is compared in each case with regard to the detection of a target object. This accomplishes the objective of on the one hand enabling the maximum possible sensitivity of the detection device, in particular at close range, and on the other hand also of ensuring that apparent echoes can be masked out which originate from atmospheric disturbances, such as, for example, fog and/or spray and/or rain and/or exhaust gases and the like. In this case, the invention is based on the insight that the prior art does not take account of the fact that a scanning detection device, in particular a laser scanner, can have a varying sensitivity over the entire scanning angle range depending on the optical construction. While the sensitivity is relatively high in the case of some scanning angles of the emitter, the sensitivity of the detection device is significantly lower in the case of other scanning angles. This can be attributed, in particular, to the fact that, depending on the scanning angle, different cross sections of the mirror are available for the deflection of the beams reflected in the surroundings. In the case of a smaller cross section of the mirror, the received energy of the beams for a given distance is thus lower than in the case of larger cross section. In the case of a smaller cross section, therefore, a lower threshold value should accordingly be defined for the reception signal in order to be able to ensure than genuine target objects can be detected.

The optical emitter can comprise e.g. a light source, in particular a laser. A diode, for example, can be used as the source. The emitter can also comprise a mirror by means of which the emitted beams are deflected. The mirror can be mounted in a pivotable fashion. Different angular positions of the mirror then correspond to different scanning angles within the scanning angle range. The emitter is preferably designed for emitting a respective beam pulse, in particular a laser pulse, for each scanning angle.

The receiver can comprise one or a plurality of receiving elements, in particular photodiodes and/or phototransistors. The receiving elements used can be in particular avalanche semiconductor elements, in particular avalanche photodiodes. In the reception beam path the abovementioned mirror or a separate mirror can also be arranged, by means of which the beams reflected in the surroundings are deflected in the direction of the receiver.

It proves to be particularly advantageous if the angle-dependent threshold value function correspondingly over the entire scanning angle range corresponds to a measurement sensitivity function of the optical receiver which is angle-dependent or changes over the scanning angle range and which indicates a sensitivity of the receiver for different scanning angles. This angle-dependent threshold function can have the form of a quadratic function which has a maximum in particular for the central scanning angles and falls in the direction of the two lateral scanning angles in edge regions of the scanning angle range. Generally, the angle dependence depends on the angle by way of trigonometric relationships. That may be different for differently configured optical constructions. Consequently, it is therefore possible to ensure that genuine target objects can also be reliably detected in the edge region of the scanning angle range or in the edge region of the field of view of the detection device, that is to say precisely where the sensitivity of the detection device is low.

By way of example, a different threshold value of the detection threshold is in each case predefined for each or every n-th scanning angle. In this case, n can lie in a value range of 2 to 10.

Preferably, the evaluation device is designed, within a first time interval after emission of an emission beam by the emitter (for a specific scanning angle), to compare the electrical reception signal firstly with a first detection threshold provided for a close-range measurement and, within a second time interval following the first time interval, to compare the electrical reception signal with a second detection threshold provided for a long-range measurement. Therefore, a total of two detection thresholds can be provided, namely on the one hand a first detection threshold for the close-range measurement (e.g. up to a distance of 10 m to 20 m from the motor vehicle, in particular up to a distance of 15 m) and on the other hand a second detection threshold for the long-range measurement (e.g. starting from 15 m). In this case, the abovementioned angle-dependent threshold value function preferably represents the first detection threshold provided for the close-range measurement. This is because it has been found that it is precisely at close range up to approximately 15 m from the motor vehicle that the atmospheric disturbances and, if appropriate, also dirt and the like are particularly problematic with regard to the generation of apparent echoes. In principle, therefore, the detection threshold defined at said close range is intended to be higher than that defined at long range. The first detection threshold is thus preferably higher than the second detection threshold over the entire scanning angle range.

While the first detection threshold—as explained—is formed by the angle-dependent threshold value function, the second detection threshold in one embodiment has a profile that is constant over the entire scanning angle range, such that for all scanning angles preferably identical threshold values for the reception signal are predefined in the case of the long-range measurement.

Alternatively, however, it can also be provided that the second detection threshold applied to the long-range measurement is also an angle-dependent threshold value function which has mutually different threshold values for the reception signal for a plurality of different scanning angles of the emitter. Consequently, the second detection threshold can also be adapted, if appropriate, to the angle-dependent sensitivity profile of the receiver.

It can also be provided that exclusively for a subset of the scanning angles, in particular for every n-th scanning angle, the first and second detection thresholds are applied and, for the remaining scanning angles, exclusively the second detection threshold is applied both to the close-range measurement and to the long-range measurement. In this case, n represents an integer from a value range of 2 to 10. The outlay when switching between the two thresholds is thus reduced since it is not necessary to switch between the two thresholds for all scanning angles and the resolution of the system at close range is not of such great importance as at long range.

A motor vehicle according to the invention comprises a detection device according to the invention. The motor vehicle is preferably a car.

The invention also relates to a method for operating a scanning optoelectronic detection device which comprises the features of the independent method claim.

The preferred embodiments presented with regard to the detection device according to the invention and their advantages are correspondingly applicable to the motor vehicle according to the invention and to the method according to the invention.

Further features of the invention are evident from the claims, the figures and the description of the figures. All features and feature combinations mentioned above in the description and the features and feature combinations mentioned below in the description of the figures and/or shown in the figures alone can be used not only in the combination respectively indicated, but also in other combinations or else by themselves.

The invention will now be explained in greater detail on the basis of one preferred exemplary embodiment and with reference to the accompanying drawings in which.

Figure 8:
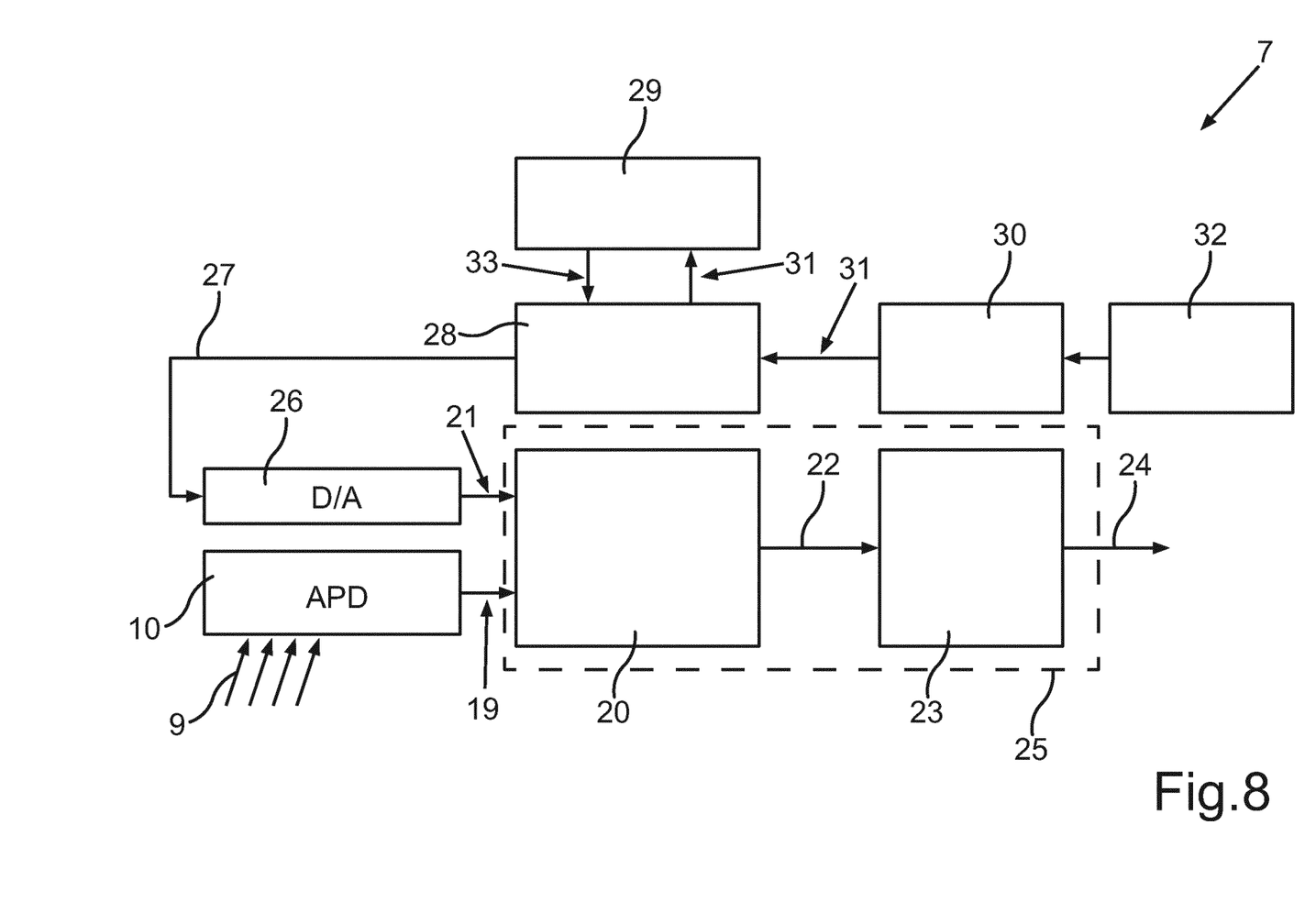
FIG. 8 shows a block diagram of a detection device in accordance with one embodiment of the invention.

Referring to FIG. 8, a detection device 7 comprises a receiver 10 designed as an avalanche photodetector. An amplifier circuit is also integrated into the receiver 10. The receiver 10 receives the beams 9 reflected in the surroundings and provides an analogue electrical reception signal 19, the magnitude of which is dependent on the energy of the beams 9. The electrical reception signal is fed to an analogue comparator 20, which additionally receives an analogue threshold value signal 21. Said threshold value signal 21 represents—depending on the respective time interval T1, T2 in accordance with FIGS. 4 and 5—alternately the first detection threshold 16 or the second detection threshold 17. The comparator 20 outputs a binarized electrical reception signal 22 at its output, said signal being fed to a unit 23, which measures the distance from the target object depending on the reception signal 22. Distance measurement values 24 are output at the output of the unit 23. The comparator 20 and the unit 23 overall form an electronic detection device 25.

The analogue threshold value signal 21 is provided from a digital threshold value signal 27 by means of a digital-to-analogue converter 26 and is output to the comparator 20. A control device 28 is provided for providing the digital threshold value signal 27, said control device being connected to a memory 29. A table is stored in the memory 29, in which table each scanning angle of the emitter or every n-th scanning angle is assigned in each case a different threshold value for the comparator 20. The control device 28 receives the current scanning angle 31 in the azimuth direction from an angle encoder 30. In this case, the angle encoder 30 is connected to a scanning motor 32 designed for pivoting the mirror 3 in accordance with FIG. 1. For the current scanning angle 31, the control device 28 reads out the assigned threshold value 33 from the memory 29 and generates the digital threshold value signal 27 characterizing the current angle-dependent threshold value 33.

Consequently, a threshold value signal 21 having a magnitude corresponding to the current threshold value which is individually chosen for the current scanning angle is present at the comparator 20.

The angle-dependent threshold value function is preferably used for the close-range measurement, i.e. for the first time interval T1 in accordance with FIGS. 4 and 5. Optionally, however, the second detection threshold 17 can also be set for the second time interval T2 or for the long-range measurement in an angle-dependent manner or depending on the current scanning angle.

Figure 2:
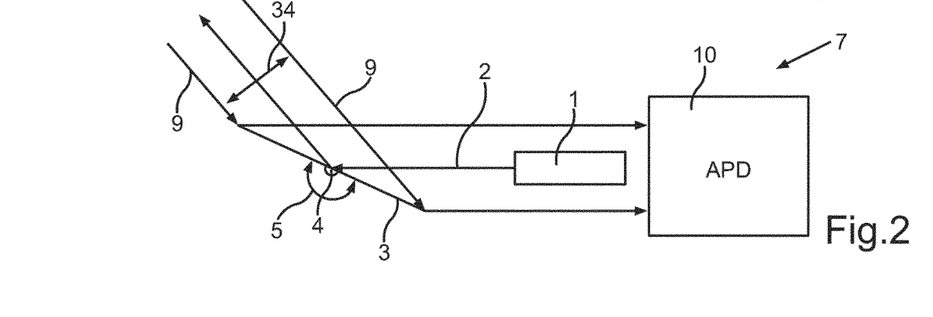
FIG. 2 shows the detection device in accordance with FIG. 1 in a schematic illustration, wherein a different scanning angle of a mirror is set in order to illustrate different effective cross sections of a mirror.

The angle-dependent setting of the detection threshold 16 is based on the fact that the sensitivity of the receiver 10 is also angle-dependent and varies over the entire scanning angle range 8. Referring to FIGS. 1 and 2, for each scanning angle of the emitter, a different cross section of the mirror 3 is provided from the standpoint of the received beams 9, as is indicated overall by 34 in FIGS. 1 and 2. This means that at different scanning angles mutually different cross sections 34 of the mirror 3 are available for the beams 9 reflected in the surroundings. Consequently, a different energy of the beams 9 is provided for each scanning angle.

Figure 6:
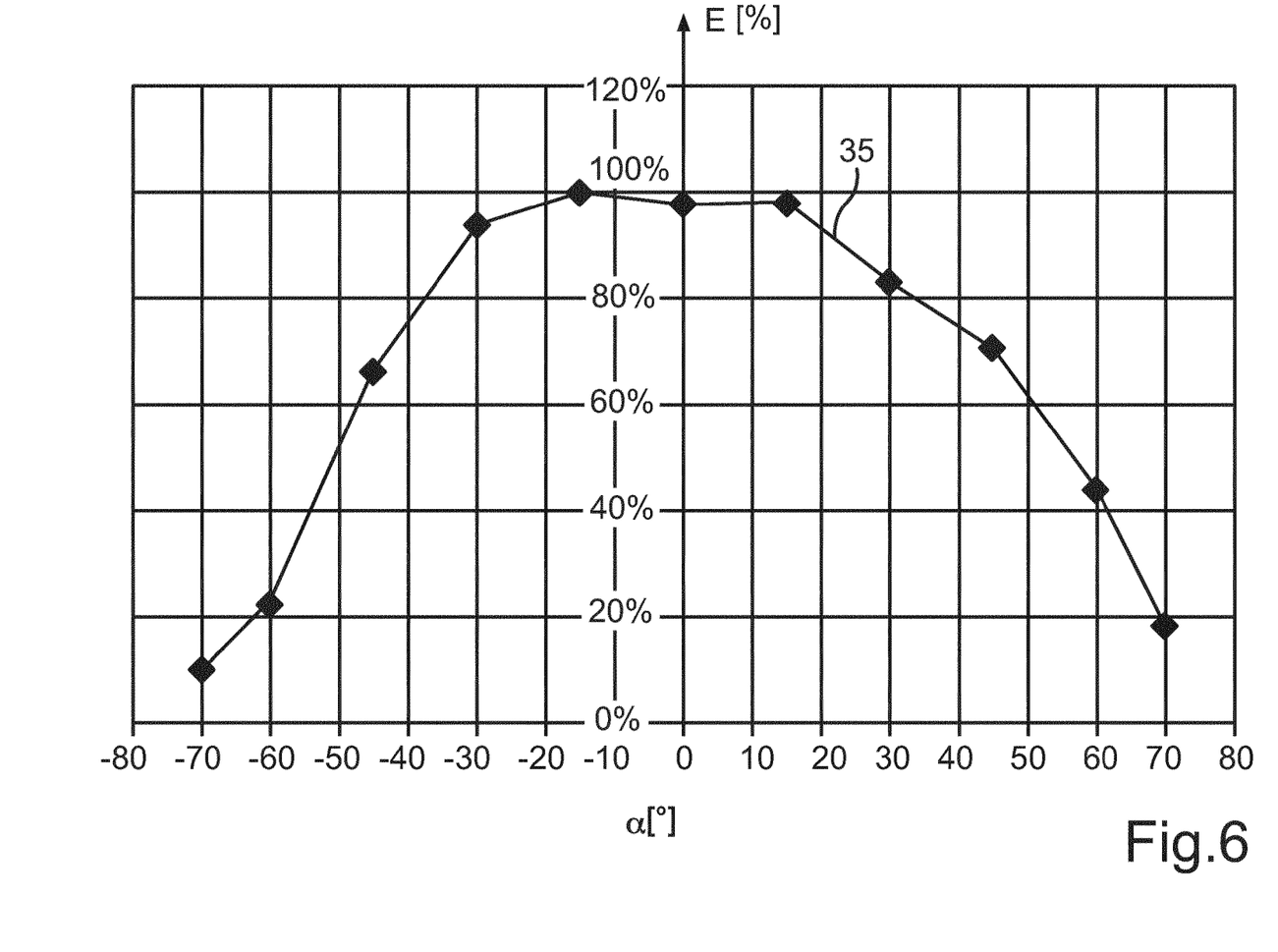
FIG. 6 shows an exemplary angle-dependent sensitivity function of the receiver.

The detection device 7 therefore has an angle-dependent (in the azimuth direction) sensitivity function. One exemplary sensitivity function 35 is illustrated in FIG. 6. This function 35 is normalized or represents a relative sensitivity function. As is evident from FIG. 6, the function 35 has substantially or approximately the profile of a quadratic function having a maximum in the central region of the scanning angle range 8. In this case, the scanning angle α is plotted on the x-axis, while the relative sensitivity E in % is plotted on the y-axis. The sensitivity is lowest in the respective edge regions of the entire azimuthal scanning angle range 8.

Figure 7:
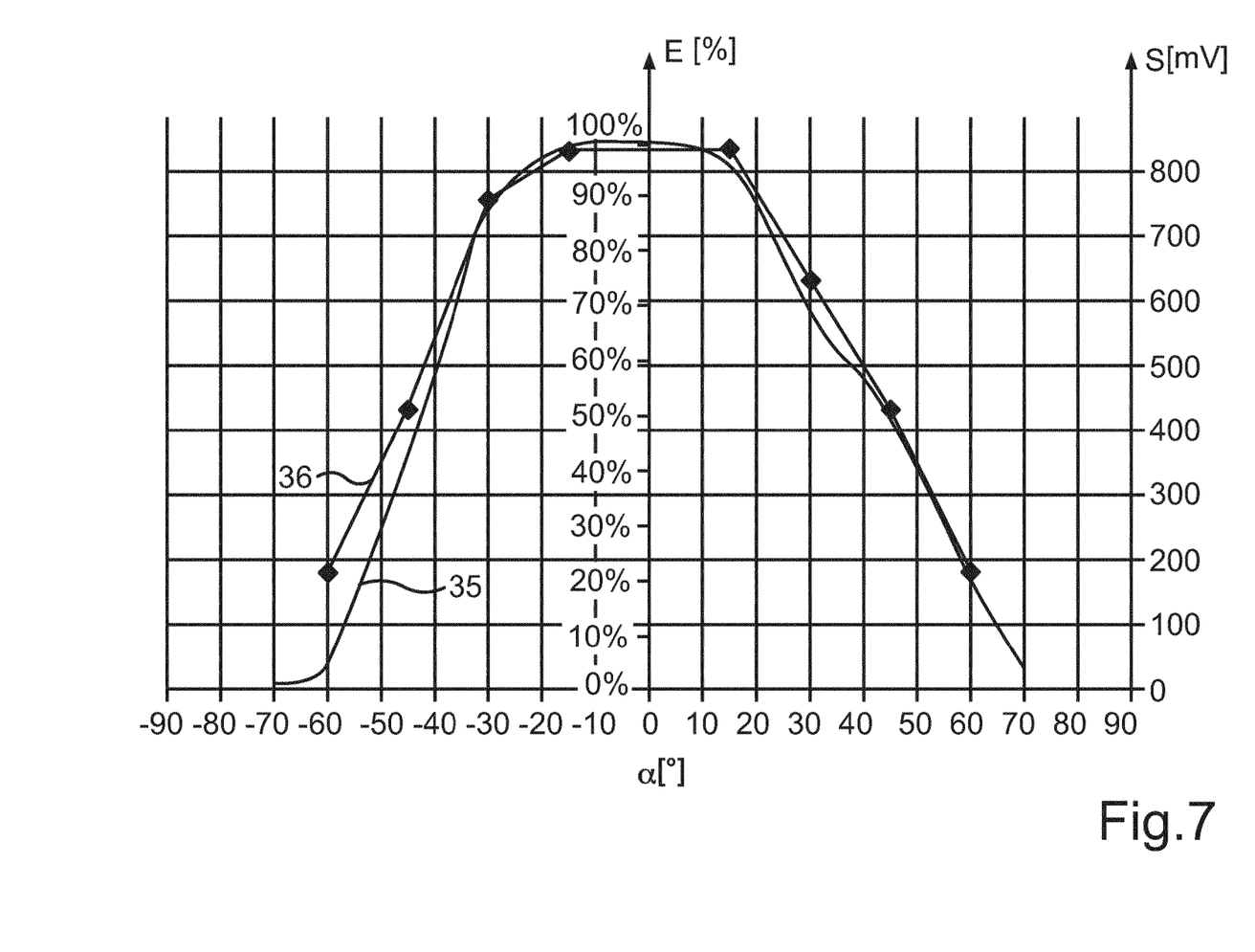
FIG. 7 shows an angle-dependent threshold value function in accordance with one embodiment of the invention, wherein the threshold value function is adapted to the sensitivity function.

The angle-dependent threshold value function for the detection threshold 16 is now adapted to the profile of the sensitivity function 35. FIG. 7 illustrates a comparison of the sensitivity function 35 with an angle-dependent threshold value function 36. The scale (in mV) represented on the right-hand side applies to the threshold value function 36 and thus indicates the magnitude of the threshold values S in mV. As is evident from FIG. 7, the profile of the threshold value function 36 corresponds to that of the sensitivity function 35, such that the two profiles at least approximately overlap. The two functions are also substantially symmetrical with respect to the scanning angle 0° and fall uniformly on both sides.

The invention claimed is:

1. A scanning optoelectronic detection device comprising a laser scanner, for a motor vehicle, comprising:
an optical emitter for emitting electromagnetic beams, comprising an optical receiver for receiving beams reflected at a target object in surroundings of the motor vehicle and for providing an electrical reception signal depending on the received beams; and
an evaluation device for detecting the target object depending on the electrical reception signal, wherein the emitter is designed to emit a respective emission beam for a multiplicity of different scanning angles within an entire scanning angle range, and wherein the evaluation device is configured, for each scanning angle, to compare the reception signal with a detection threshold and to detect the target object depending on the comparison,
wherein a control device receives a current scanning angle from an angle encoder and the detection threshold is an angle-dependent threshold value function which has mutually different threshold values for the reception signal for at least two different scanning angles of the emitter determined by the angle encoder.

2. The detection device according to claim 1, wherein a profile of the threshold value function corresponds to a profile of an angle-dependent sensitivity function of the receiver which indicates a sensitivity of the receiver for different scanning angles.

3. The detection device according to claim 1, wherein the evaluation device is configured, within a first time interval after emission of an emission beam by the emitter, to compare the electrical reception signal with a first detection threshold provided for a close-range measurement and, within a second time interval following the first time interval, to compare the electrical reception signal with a second detection threshold provided for a long-range measurement, and wherein the first detection threshold is the angle-dependent threshold value function.

4. The detection device according to claim 3, wherein exclusively the first detection threshold is an angle-dependent threshold value function.

5. The detection device according to claim 3, wherein the first and second detection thresholds are both an angle-dependent threshold value function.

6. The detection device according to claim 3, wherein the evaluation device is designed exclusively for a subset of the scanning angles comprising every n-th scanning angle, to apply the first and second detection threshold, and wherein for remaining scanning angles, to apply exclusively the second detection threshold both to the close-range measurement and to the long-range measurement, wherein n is an integer from a value range of 2 to 10.

7. A motor vehicle comprising the detection device according to claim 1.

8. A method for operating a scanning optoelectronic detection device comprising a laser scanner, of a motor vehicle, the method comprising:
emitting electromagnetic beams by an optical emitter;
receiving, by an optical receiver, beams reflected at a target object in surroundings of the motor vehicle;
providing an electrical reception signal depending on the received beams;
detecting, by an evaluation device, the target object based on the electrical reception signal, wherein the emitter emits a respective emission beam for a multiplicity of different scanning angles within an entire scanning angle range; and
comparing, by the evaluation device and for each scanning angle, the reception signal with a detection threshold and detecting the target object based on the comparison,
wherein a control device receives a current scanning angle from an angle encoder and an angle-dependent threshold value function is predefined as the detection threshold, in the case of which threshold value function mutually different threshold values for the reception signal are predefined for at least two different scanning angles of the emitter determined by the angle encoder.

* * * * *